United States Patent [19]
Gassies et al.

[11] Patent Number: 5,895,321
[45] Date of Patent: Apr. 20, 1999

[54] GAMBLING CHIP

[75] Inventors: Christophe Gassies, Echevronne; Dominique Boiron, Beaune, both of France

[73] Assignee: Etablissements Bourgogne et Grasset, Savigny-les-Beaune, France

[21] Appl. No.: 08/750,800

[22] PCT Filed: Oct. 7, 1996

[86] PCT No.: PCT/FR96/01558

§ 371 Date: Dec. 20, 1996

§ 102(e) Date: Dec. 20, 1996

[87] PCT Pub. No.: WO97/13424

PCT Pub. Date: Apr. 17, 1997

[30] Foreign Application Priority Data

Oct. 9, 1995 [FR] France .................... 95 11877

[51] Int. Cl.[6] .................................. A63F 9/24
[52] U.S. Cl. ............. 463/29; 273/148 R; 273/288; 40/27.5; 463/25
[58] Field of Search ................. 273/148 R, 288; 463/29, 25; 40/27.5

[56] References Cited

U.S. PATENT DOCUMENTS

| | | | |
|---|---|---|---|
| 1,935,308 | 11/1933 | Baltzley | 273/148 R |
| 2,410,845 | 11/1946 | Snell et al. | 40/27.5 |
| 2,450,997 | 10/1948 | Shann | 361/167 |
| 2,836,911 | 6/1958 | Priesmeyer | 40/27.5 |
| 2,983,354 | 5/1961 | Ember et al. | 194/211 |
| 3,295,651 | 1/1967 | Klackowski et al. | 194/214 |
| 3,439,439 | 4/1969 | Stimson | 40/1.5 |
| 3,670,524 | 6/1972 | Korwin | 63/18 |
| 3,766,452 | 10/1973 | Burpee et al. | 40/27.5 |
| 3,926,291 | 12/1975 | Burke et al. | 194/213 |
| 3,953,932 | 5/1976 | Graves | 40/27.5 |
| 3,968,582 | 7/1976 | Jones | 40/27.5 |
| 3,983,646 | 10/1976 | Howard | 40/27.5 |

(List continued on next page.)

FOREIGN PATENT DOCUMENTS

| | | |
|---|---|---|
| 6854690 | 7/1991 | Australia . |
| 0147099 | 7/1985 | European Pat. Off. . |
| 0424355 | 4/1991 | European Pat. Off. . |
| 0436497 | 7/1991 | European Pat. Off. . |
| 0444373 | 9/1991 | European Pat. Off. . |
| 0564051 | 10/1993 | European Pat. Off. . |
| 0570062 | 11/1993 | European Pat. Off. . |
| 0570784 | 11/1993 | European Pat. Off. . |
| 0646893 | 4/1995 | European Pat. Off. . |
| 0650148 | 4/1995 | European Pat. Off. . |
| 0694872 | 1/1996 | European Pat. Off. . |
| 1001412 | 2/1952 | France . |
| 2644268 | 9/1990 | France . |
| 2656538 | 7/1991 | France . |
| 2663145 | 12/1991 | France . |
| 2554293 | 3/1995 | France . |
| 2721733 | 12/1995 | France . |
| 8909783 | 9/1990 | Germany . |
| 9300173 | 3/1993 | Germany . |
| 4311561 | 10/1994 | Germany . |
| 29505951 | 6/1995 | Germany . |
| 1599120 | 9/1981 | United Kingdom . |
| 2075732 | 11/1981 | United Kingdom . |
| 2077556 | 12/1981 | United Kingdom . |
| 2153128 | 8/1985 | United Kingdom . |
| 2180086 | 3/1987 | United Kingdom . |
| 8801082 | 2/1988 | WIPO . |
| 9221105 | 11/1992 | WIPO . |
| 9508164 | 3/1995 | WIPO . |
| 9614115 | 5/1996 | WIPO . |

*Primary Examiner*—Benjamin H. Layno
*Attorney, Agent, or Firm*—Greenblum & Bernstein, P.L.C.

[57] ABSTRACT

The gambling chip 10, having the general shape of a disc, includes two identical half-discs 11 and 12 in contact via axial spacing rings 21 and 22 respectively located on their internal faces. The half-discs 11 and 12 made of rigid plastic are fastened together by injection of a plastic seal 14 on the edge 35 of the chip into a peripheral annular region 16 lying between the two half-discs 11 and 12. The half-discs 11 and 12 have a central recess 26, 27 forming an internal central region 28 taking an electronic identification device 30 embedded in a wafer based on epoxy resin.

39 Claims, 6 Drawing Sheets

U.S. PATENT DOCUMENTS

| | | | |
|---|---|---|---|
| 4,026,309 | 5/1977 | Howard | 40/27.5 |
| 4,261,947 | 4/1981 | Ogi | 264/263 |
| 4,371,071 | 2/1983 | Abedor et al. | 40/27.5 |
| 4,395,043 | 7/1983 | Gargione | 273/239 |
| 4,399,910 | 8/1983 | Gutentag | 206/82 |
| 4,435,911 | 3/1984 | Jones | 40/27.5 |
| 4,511,796 | 4/1985 | Aigo | 235/492 |
| 4,637,613 | 1/1987 | Bishop | 273/239 |
| 4,674,618 | 6/1987 | Eglise et al. | 194/210 |
| 4,675,973 | 6/1987 | Siu | 273/239 |
| 4,725,924 | 2/1988 | Juan | 361/751 |
| 4,814,589 | 3/1989 | Storch et al. | 235/375 |
| 4,818,855 | 4/1989 | Mongeon et al. | 235/440 |
| 4,827,640 | 5/1989 | Jones | 40/27.5 |
| 4,838,404 | 6/1989 | Smith et al. | 194/212 |
| 4,926,996 | 5/1990 | Eglise et al. | 194/212 |
| 4,969,549 | 11/1990 | Eglise | 194/205 |
| 4,973,524 | 11/1990 | Huebner et al. | 428/683 |
| 4,983,820 | 1/1991 | Dias | 235/492 |
| 4,999,742 | 3/1991 | Stampfi | 361/400 |
| 5,038,022 | 8/1991 | Lucero | 235/380 |
| 5,094,922 | 3/1992 | Ielpo et al. | 428/579 |
| 5,103,081 | 4/1992 | Fisher et al. | 235/494 |
| 5,166,502 | 11/1992 | Rendleman et al. | 235/492 |
| 5,216,234 | 6/1993 | Bell | 235/494 |
| 5,283,422 | 2/1994 | Storch et al. | 235/375 |
| 5,361,885 | 11/1994 | Modler | 194/214 |
| 5,399,847 | 3/1995 | Droz | 235/488 |
| 5,406,264 | 4/1995 | Plonsky et al. | 340/572 |
| 5,451,756 | 9/1995 | Holzer et al. | 235/381 |
| 5,498,859 | 3/1996 | Farmont | 235/384 |

GAMBLING CHIP

BACKGROUND OF THE INVENTION

1. Field of the Invention

The present invention relates to gambling chips, also called casino chips. Gambling chips denote an element which can be used in a gambling hall and representing a nominal value, which may or may not be predetermined. These chips are classified into two families according to the type of gambling for which they are used. "French or European" chips have a predetermined value, while 'American' chips may or may not have a predetermined value.

2. Background of Prior Art

In general, chips are manufactured from a rigid and scratch-resistant plastic. The chips have patterns which are varied design and in terms of color in order to reduce the risk of counterfeiting. In addition, these patterns may incorporate information such as the identification of the casino and/or the value of the chip. The tokens are thus marked both their faces and edge in order to make it easier to identify the chips when they are being handled or stacked on the gambling table.

In practice, the operation of marking the edge, carried out for example by sublimation, is tricky and expensive. The object of the invention is to propose a chip having a relatively simple and robust structure allowing especially edge marking to be facilitated.

SUMMARY OF THE INVENTION

To this end, the invention proposes a gambling chip having the general shape of a disc, or similar device and/or shape representing a nominal value which may or may not be predetermined. The invention includes two half-discs made of rigid plastic which are in contact via at least one axial separating projection provided on at least one of the internal faces of the half-discs; these projection(s) define a peripheral annular region (for a disc shaped chip) emerging on the side of the chip, a fastening seal made of plastic being deposited by injection into the said peripheral annular region.

The structure of the chip according to the invention has several advantages compared with conventional solid chips. By choosing the design on the edges of the groove forming the peripheral annular region, the angular position of the two half-discs, and different colors for the sealant and of the half-discs, it is possible to obtain, without an additional operation, edge marking which is distinct, indelible (by marking into the material) and unfalsifiable. This latter point is highly advantageous when edge marking is used to represent the value of the chip. In addition, the fastening between the two half-discs is rugged and completely sealed without accordingly deforming the plane external faces of the half-discs. Finally, the structure obtained allows central inserts to be placed between the two half-discs, for example pieces of metal ballast, but also relatively fragile inserts such as electronic-circuit devices.

In particular, according to one embodiment of the invention, the internal faces of the two half-discs define between them an internal central region in the chip. Advantageously, the chip includes an insert having the shape of an electronic device, for example an electronic device incorporating a memory carrying the identification of the chip and a transmitter/receiver having a peripheral antenna, and arranged in the said internal central region between the two half-discs either directly or encapsulated in a package or embedded in a protective wafer of synthetic resin.

Advantageously, at least one half-disc of the chip has a central recess on its internal face in order to form all or part of the internal central region in the chip. Optionally, the free space in the internal central region is totally or completely filled with adhesive or resin.

By way of an alternative form, the internal face of at least one half-disc includes an axial separating projection consisting of a continuous or discontinuous, circular or polyhedral ring coaxial with the half-disc and delimiting the internal central region of the said peripheral annular region.

According to a first alternative form, the chip includes a half-disc having an internal face which carries a ring forming an axial separating projection and is associated with a half-disc having a substantially plane internal face.

According to a second alternative form, the chip includes two half-discs having an internal face which carries a ring forming an axial separating projection, the said rings each having a contacting top surface preferably arranged substantially in the plane of symmetry XX' of the chip parallel to the external faces of the said chip. Advantageously, the contacting top surface of the rings include an arrangement of circularly arcuate lips and grooves which are complementary in order to allow pre-assembly of the half-discs, especially by interlocking.

In order to make it easier to introduce the injected substance, the ring of at least one half-disc has through channels or slots in order to make the peripheral annular region communicate with the internal central region.

In order to reduce the costs, improve the cohesion of the chip and make it easier to control the shrinkages during the injection operations, the internal faces of the two half-discs of the chip include axial projections opposite each other and having contact surfaces preferably arranged substantially in the plane of symmetry XX' of the chip parallel to the external faces of the said chip. Optionally, the contact surfaces between the said axial projections include an arrangement of studs and hollow housings which are complementary in order to allow pre-assembly of the half-discs, especially by interlocking. Advantageously, the half-discs of the chip are identical.

According to yet another alternative form of the chip according to the invention, the internal face of at least one half-disc includes a plurality of axial separating projections consisting of fingers substantially delimiting the internal central region, the said fingers being arranged so as to hold in place in the internal central region a ballast-forming insert disc or a disc carrying an electronic device.

According to yet another alternative form of the chip according to the invention, the internal face of each half-disc includes a plurality of axial separating projections consisting of fingers substantially delimiting the internal central region, the said fingers having a shoulder intended to hold substantially in place at the centre of the internal central region a wafer made of synthetic material and incorporating the electronic device.

Optionally, the internal face of at least one half-disc has radial guides arranged in the said peripheral annular region in order to retard the flow of substance injected around the said peripheral annular region and to make it easier to fill the internal central region.

Also optionally, the half-discs have substantially plane external faces and include peripheral cut-outs and/or through cut-outs in communication with the said peripheral annular region in order to allow the plastic of the said seal to come to the surface on the edges and/or through the said external faces and thus to produce face patterns for the chip.

3

Advantageously, the edges of the cut-outs made in the external faces of the half-discs are bevelled and embedded in the plastic coming from the seal.

Moreover, the plastics used, on the one hand, for the seal and, on the other hand, for the two half-discs may or may not be chosen so as to be identical and are obtained from a base polymer chosen from the following polymers:

polyacetal and acetal copolymers (POM);

polyamides and their copolymers;

poly(alkylene terephthalate) polymers, especially polybutylene terephthalate (PBT);

thermoplastic polyurethanes (PUR);

vinyl polymers, especially polyvinyl chloride (PVC); and polyolefins, especially polyethylenes (PE) and polypropylenes.

BRIEF DESCRIPTION OF THE DRAWINGS

Further objects, features and advantages will appear on reading the description which follows of several embodiments of the invention, these being given by way of non-limiting examples, with reference to the designs appended herein, in which.

DETAILED DESCRIPTION OF THE PREFERRED EMBODIMENTS

Figure 1:
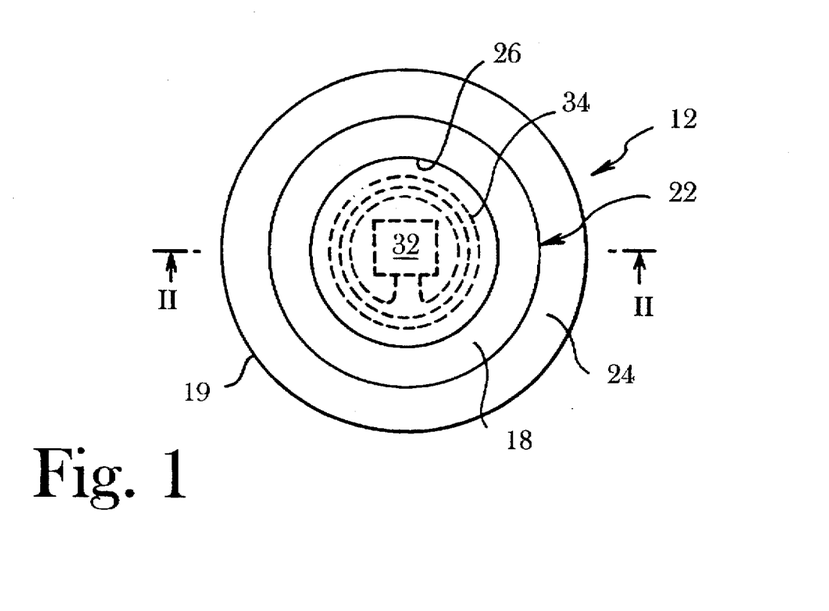
FIG. 1 depicts a front view (on the internal face side) of a half-disc of a gambling chip according to the present invention.
Figure 2:
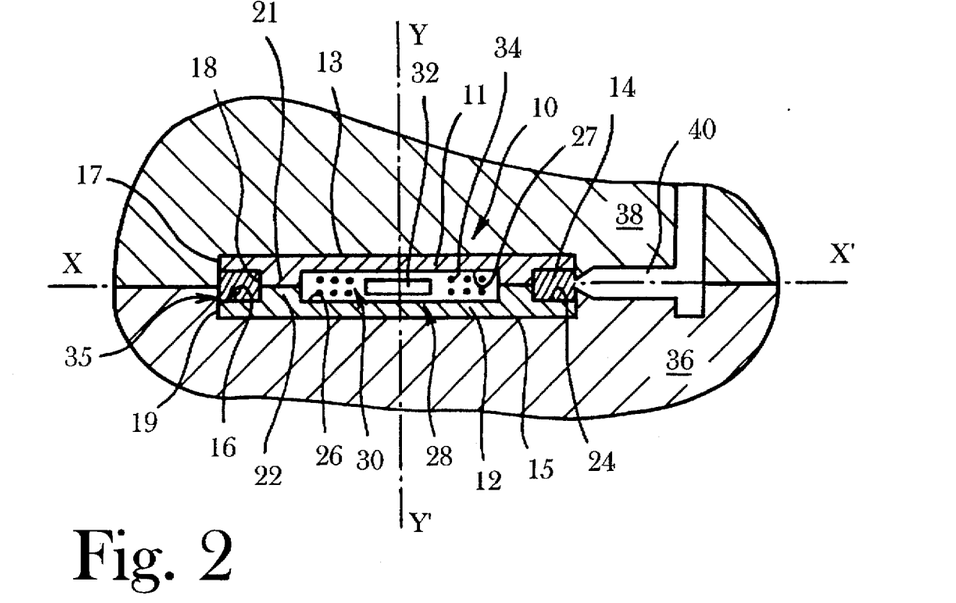
FIG. 2 depicts a diametral sectional view on the line II—II of a gambling chip incorporating the half-disc illustrated in FIG. 1.

FIGS. 1 and 2 relate to a first embodiment of a gambling chip according to the invention. More particularly, the gambling chip 10 includes two half-discs 11 and 12, of axis YY', which are fastened together by means of a plastic seal 14 injected into the edge 35 of the chip into a peripheral region 16 lying between the two half-discs 11 and 12. In the embodiment described here by way of non-limiting example, the peripheral annular region is in the form of a groove. For reasons of cost and tolerances of the chip (especially the tolerances regarding the planarity of the faces of the finished chip, taking into account the risk of deformation of the external faces 13 and 15 of the half-discs when injecting the seal 14), the two half-discs 11 and 12 are preferably identical in contact in and symmetrical about axis XX' of the chip parallel to the external faces 13 and 15 via axial separating projections (along the axis YY' perpendicular to the chip 10). In the present case, the separating projections are two circular rings 21 and 22 respectively provided on the internal faces of the half-discs 11 and 12, the bearing surfaces being defined by the top surfaces of the rings 21 and 22.

As illustrated in FIG. 1, which shows a front view of the half-disc 12 (on the internal face side), the ring 22, coaxial with the half-disc 12, separates a peripheral annular surface 24 cone of the side walls of the groove 16) from a central recess 26. Recess 26 mates with the facing central recess 27 of to define an internal central region 28 designed to hold an insert. In the present case, the insert is a memory-type electronic device 30 pre-embedded in a protective wafer of synthetic resin, for example, epoxy resin.

The memory-type electronic device 30 preferably includes an electronic circuit 32 incorporating a PROM memory carrying information relating to the chip. For example a 64-bit numerical or alphanumeric fixed identification code (including one or more fields such as: a chip serial number, the identification of the casino, the numerical value of the chip, etc.) A transmitter/receiver having a peripheral antenna 34 is powered by inductive coupling. In practice, the transmitter/receiver is capable of exchanging, without physical contact, using modulated waves, data with a fixed read station approximately 15 cm away, the working frequency lying between 10 kHz and 20 MHz. The memory-type electronic device makes it possible to (1) combat theft and/or conterfeiting of the chips, (2) make it easier to manage the entire holding of chips in a gambling hall. Of course, without departing from the scope of the invention, the memory-type electronic device 30, of the non-reprogrammable (read only) type, may be replaced by a reprogrammable device having a changing code with the possibility of reading and writing in memory. Finally, for chips without electronic protection, the internal central region 28 may take a simple piece of metal ballast, or be simply filled with the injection substance of the seal.

The two half-discs for chips according to the invention, especially the half-discs 11 and 12, are obtained by the injection molding of a rigid plastic, for example one based on polyamide, PA-6, PA 6-6 or ABS. In the present case, the same basic polymer, polyamide, is used for the seal 14, in order to ensure good fastening and cohesion between the seal and the half-discs during the final injection (owing to the partial-melting/welding effect). In general, the plastics used for the half-discs on the one hand and the seal on the other may be chosen from, inter alia, the following plastics: polyacetal and acetal copolymers (POM), polyamides and their copolymers, poly(alkylene terephthalate) polymers, especially polybutylene terephthalate (PBT); thermoplastic polyurethanes (PUR), vinyl polymers, especially polyvinyl chloride (PVC), polyolefins, especially polyethylenes (PE) and polypropylenes, or from pairs of polymers capable of good welding between them, preferably ABS/PMMA, ABS/ PBT, PA 6/thermoplastic polyurethane, PA 6-6/ thermoplastic polyurethane, or polycarbonate/PBT. Of course, the compositions may vary, especially the fillers incorporated into the materials used for the half-discs and the fastening seal. For example weighting fillers (baryte, metal powders, zinc oxide, etc.) or the coloring fillers (zinc oxide, etc.) may be adjusted to produce the edge marking and/or the background tint of the external faces of the chip (especially the external faces 13 and 15 of the half-discs 11 and 12) which are intended to take decorative patterns obtained by sublimation or by pressure-pad marking. The half-discs and the seals are generally made of plastics of different colors.

The manufacture of the chip 10 continues by placing. In molds 36 and 38, the internal central region 28, the electronic device 30 is placed. Device 30 may be in a wafer of filled epoxy resin. The seal 14 is injected into the edge 35 of the chip via one or more lateral injection orifices 40, contact between the two half-discs being maintained by pressure in the mould. In order to improve the assembly integrity of the chip, the two half-discs may be adhesively bonded or ultrasonically welded at their contact surfaces 18. In addition, the internal central region 28 maybe partially or completely filled with adhesive or epoxy resin to hold electronic device 30 in place and to protect it. The edge 35 of the chip is preferably surface treated by turning (scraping to remove surface flaws) after the injection. By way of non-limiting example, the gambling chips according to the invention thus obtained are in the form of a disc are approximately 40 mm in diameter with a thickness of between 3 and 4 mm, the thickness of the seal being between a third and a fifth of that of the chip.

It should be noted that the relatively rugged structure of the chip according to the invention, consisting of the two half-discs 11 and 12 and the seal 14, forms a rigid and impervious protective shell for the electronic identification device 30. Moreover, without departing from the scope of the invention, the edge profile of the edges 17 and 19 of the groove 16 may have various ornamental edge designs (corrugations, slots, zig-zags, patterns based on balls and/or diamonds). In addition, it is also possible to modify the final design of the edge by varying the respective angular position of the two half-discs before injection.

In general, in the various embodiments of the invention, the two half-discs are of the type having a solid face (no large central opening capable of taking an insert) with plane, smooth or granite-like external faces (see FIGS. 2, 4, 6, 7 and 13) or substantially plane faces with a central depression for receiving a decorative label, or a decoration produced by pressure-pad marking or sublimation (see depressions 100–100' in the external faces 101–101', 103–105, 139–139' in FIGS. 9, 11, 16 and 18).

Moreover, the external faces of the half-discs of the chips according to the invention may be marked during injection of the seal 14 by filling, with the colored sealant, cut-outs in the half-discs, (which have a color different from that of seal 14). The cut-outs represent various figurative patterns or the inscription of the name of the casino and/or of the value of the chip. Optionally, the seal may be injected through the cut-outs via injection orifices in a facial position with respect to the chip.

Figure 12:
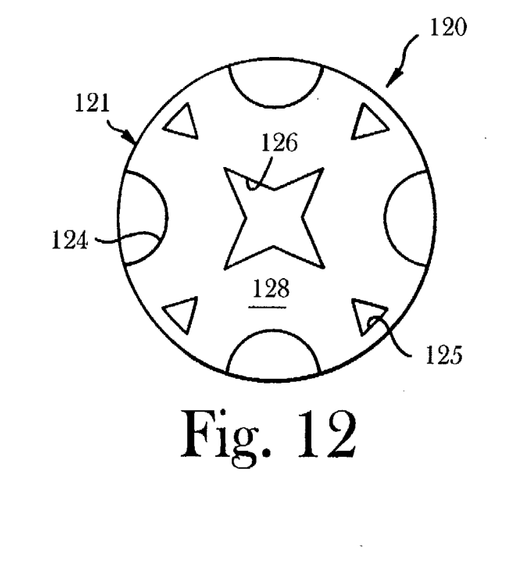
FIG. 12 depicts a front view (on the external face side) of an alternative form of a chip according to the invention.
Figure 13:
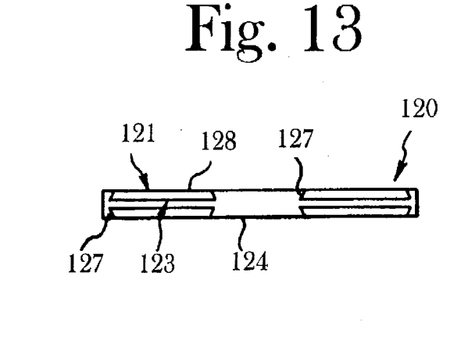
FIG. 13 depicts a side view (showing the edge) of the chip illustrated in FIG. 12.

For example, the chip 120 depicted in FIGS. 12 and 13 includes two half-discs 121 and 122 having axial separating projections (these not being visible in the figures) and being fastened together by an edge seal 123. The chip 120 shows an example of figurative geometrical facial patterns with cut-outs produced in the half-discs 121 and 122 (only the external face 128 of the half-disc 121 is depicted in FIG. 12), these cut-outs being peripheral cut-outs 124 on the rim of the chip and/or through cut-outs in lateral positions (cut-outs 125 communicating directly with the peripheral annular region) and/or in the central position (cut-out 126 communicating with the internal central region provided without an insert and communicating with the peripheral annular region via suitable passages between or through the axial separating projections). When injecting the seal 123, the free space of the cut-outs 124, 125 and 126 is filled with the color of the seal 123, this substance flowing between the two half-discs 121 and 122. Preferably, the edges 127 of the cut-outs 124, 125 or 126 are bevelled and sunk into the plastic of the seal 123 in order to ensure that the seal 123 and the half-discs 121 and 122 are locked together (see FIG. 13).

Figure 3:
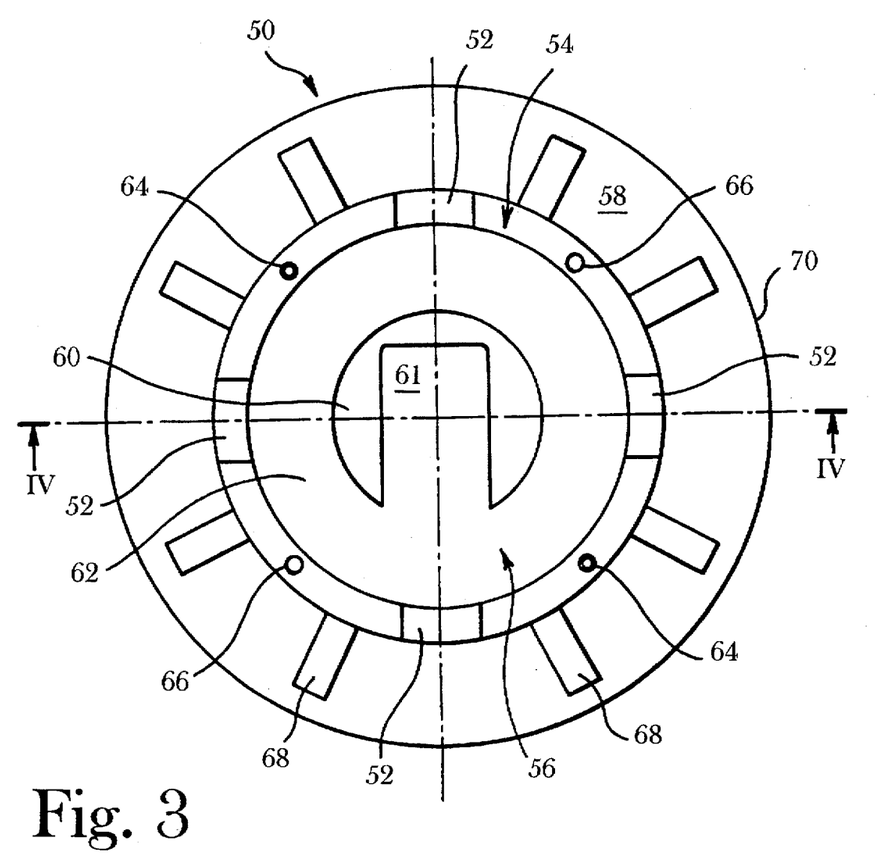
FIG. 3 depicts a front view (on the internal face side) of a half-disc of another embodiment of a gambling chip according to the invention.
Figure 4:
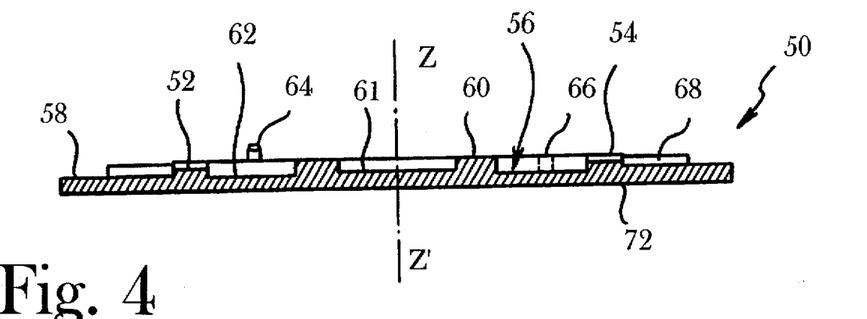
FIG. 4 depicts a diametral sectional view on the line IV—IV of the half-disc illustrated in FIG. 3.

FIGS. 3 and 4 depict the front and sectional views of a half-disc 50 of another embodiment of a chip according to the invention, this being, however, quite similar to the half-disc 12 of the chip 10 described above with reference to FIGS. 1 and 2. Thus, the description of the similar elements of the half-discs 12 and 50 will not be repeated in detail. The half-disc 50 has a plane external face 72 and an internal face (illustrated in FIG. 3) carrying an axial separating projection (along the axis ZZ' perpendicular to the chip) consisting of the ring 54. The essential differences between the half-discs 12 and 50 result, from the presence of four slots 52 through the ring 54 and uniformly distributed around the latter (see FIG. 3). This communicates recess 56 (forming half the internal central region) with the peripheral annular region. Another difference is the presence in the centre of the recess 56 of a U-shaped projection 60 (producing, for the half-disc 50, a second axial separating projection arranged in the internal central region 56) intended to form a housing 61 for the memory-type electronic circuit (not depicted) of an electronic identification device (not embedded, but protected by a heat-resistant varnish). An annular space 62 receives the peripheral antenna. If necessary, the electronic device (or any other insert) may be held in place in the internal central region by adhesive or resin. Moreover, the ring 54 has two axial pins 64 and two complementary hollow receptacles 66 distributed alternately at right angles and symmetrically with respect to the axis ZZ' of the half-disc 50 to connect with the pins and housings of the other half-disc (not depicted). This permits pre-assembly of the two half-discs forming the basic structure of the chip. Finally, on its internal face, the half-disc 50 has radial guides (or pads) 68 having, in the present case, an axial thickness less than that of the ring 54 and being arranged on either side of the slot 52. In the embodiment described here by way of non-limiting example, the guides 68 project radially in the half-groove bordered by the peripheral annular surface 58 going from the ring 54, without reaching the edge 70 of the half-disc 50, corresponding to the edge of the chip. The function of the guides 68, which may be in other forms and be of other dimensions, is to guide the flow of material around the peripheral annular region bordered by the peripheral annular surfaces (the surface 58 for the half-disc 50) during injection of the edge seal to direct the injected substance towards the slot 52; this fills the recess 56 and to encapsulate the electronic circuit and the antenna housed in the plastic of the seal.

The manufacture of the chip according to the second embodiment of the invention is obtained by the injection moulding of two identical half-discs conformed to the half-disc 50. The two pre-assembled half-discs containing the electronic device and its antenna (the angular indexation being achieved by means of the pins 64 and the housings 66) are placed in a mold. The peripheral fastening seal is injected from one or more orifices around the edge of the chip.

Figure 5:
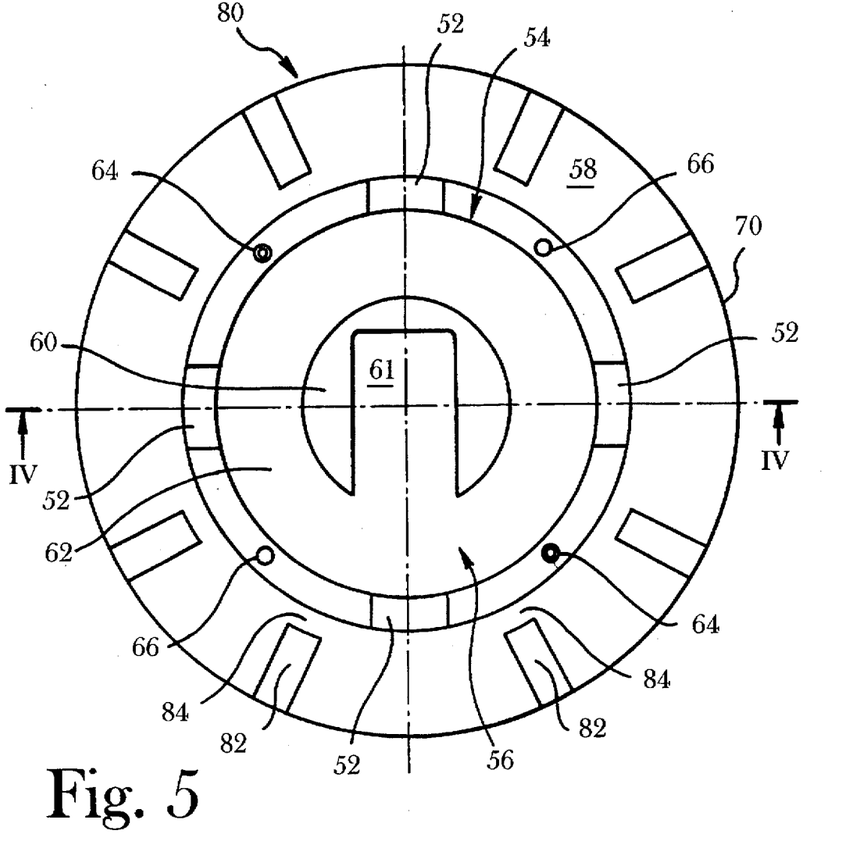
FIG. 5 depicts a front view (on the internal face side) of an alternative form of the half-disc illustrated in FIG. 3.
Figure 6:
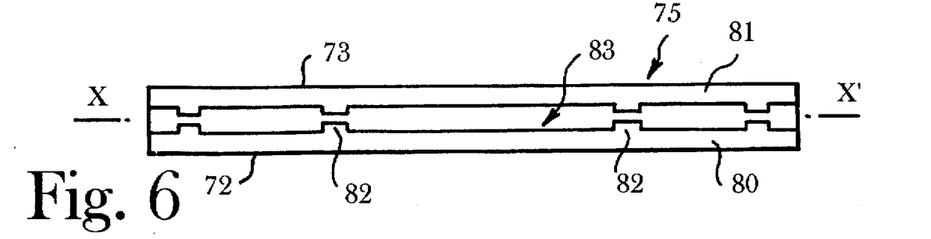
FIGS. 6 and 7 each depict a side view (showing the edge) of a chip incorporating a half-disc of the type illustrated in FIG. 5.
Figure 7:
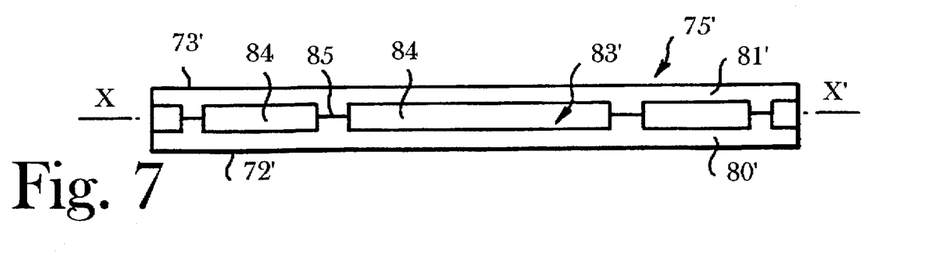

FIGS. 5–7 show another embodiment of the invention, produced from half-discs similar to that illustrated in FIGS. 3 and 4, the identical elements (which will not be described again) bearing the same numerical references.

In the half-disc 80 illustrated in FIG. 5, the radial guides (or pads) extend from the edge 70 of the half-disc, leaving a radial space 84 along the ring 54 in order to form a passage and to ensure circular continuity of the injected annular seal. It is thus possible, for the finished chips, to obtain a crenelated edge marking (see, in FIG. 6, the chip 75 with a crenelated seal 83 between the half-discs 80 and 81 in the case in which the axial thickness of the guides 82 is less than that of the ring 54) or an edge marking having separate windows (see, in FIG. 7, the chip 75' with a seal 83' between the two half-discs 80' and 81', this marking consisting of windows 84 in the case in which the axial thickness of the guides 82 is equal to that of the ring 54, the contact surface 85 between the two half-discs 80' and 81', corresponding to the bearing surface between these and lying in the plane of symmetry XX' of the chip, possibly not being visible after the final injection).

The invention is not limited to the use of identical half-discs, and covers various alternative forms in which the edges of the half-discs have different profiles in order to obtain the most varied edge patterns. However, it is often advantageous, in order to balance the shrinkages during the final injection and to ensure good planarity of the faces of the chip thus obtained, to keep the bearing and contact surfaces 18 of the axial separating projections between the two half-discs in the plane of symmetry XX' of the chip parallel to the plane external faces of the latter (faces 13, 15 for the chip 10, the faces 72, 73 for the chip 75 and the faces 72', 73' for the chip 75').

Figure 8:
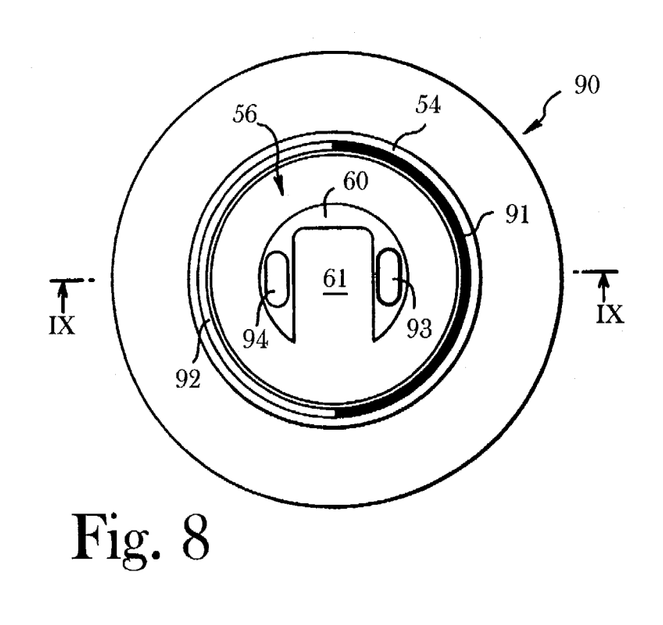
FIG. 8 depicts a front view (on the internal face side) of a half-disc of another embodiment of a gambling chip according to the invention.
Figure 9:
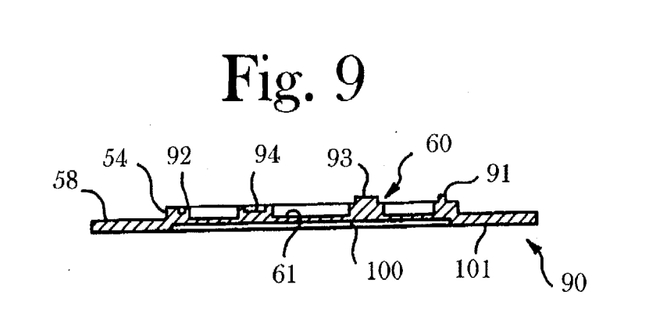
FIG. 9 depicts a diametral sectional view on the line IX—IX of the half-disc illustrated in FIG. 8.

FIGS. 8 and 9 relate to another embodiment of the invention, produced from two identical half-discs 90 similar to that illustrated in FIG. 3 and 4, similar elements (which will not be described again) bearing the same numerical references.

Figure 17:
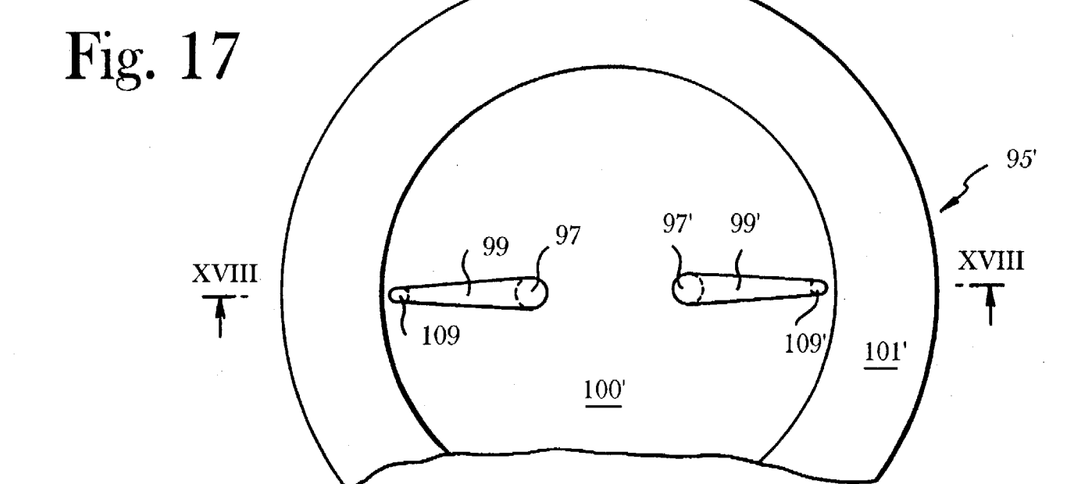
FIG. 17 depicts a partial front view (on the external face side) of another embodiment of a gambling chip according to the invention.
Figure 18:
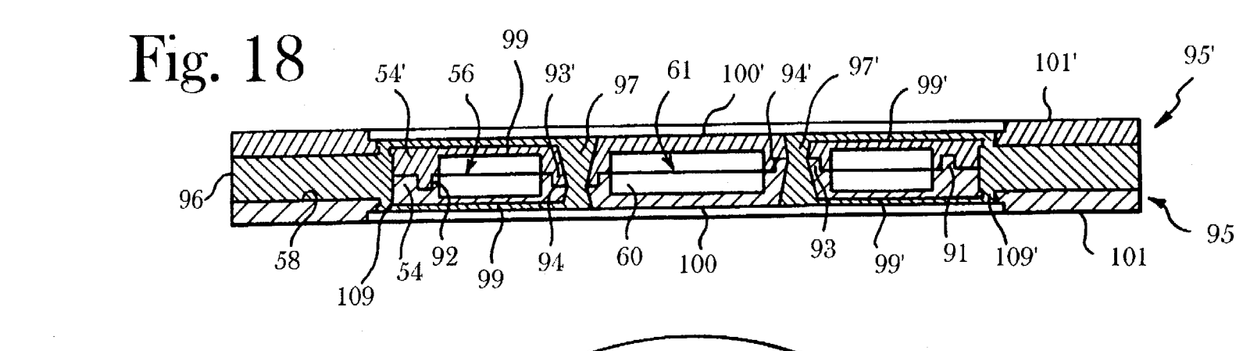
FIG. 18 depicts an enlarged diametral sectional view on the line XVIII—XVIII of the gambling chip illustrated in FIG. 17.

In the half-disc 90 illustrated in FIG. 8, the circular ring 54 is continuous so as to delimit and isolate the peripheral annular region (bordered by the surface 58) of the central region internal to the chip (consisting for a half by the recess 56). The contacting top surface of each ring 54 (one per half-disc) in this case lying in the plane of symmetry XX' of the chip, includes an arrangement of a circularly arcuate lip 91 (depicted by a thick line in FIG. 8) and the circularly arcuate groove 92. Lip 91 and groove 92 are complementary to interlock half-discs 90 are pre-assembled. Likewise, the second axial separating projection of the half-disc 90 formed by the projection 60 located in the internal central region 56 includes a stud 93 (depicted by the thick line in FIG. 8) and of a hollow housing 94, which stud and housing are complementary and also intended to mate by interlocking during the pre-assembly of the chip. As may be seen in FIGS. 8 and 9, the half-discs 90 need not have radial guides. The internal central region 56, isolated from the fastening seal by the rings 54, may, after placement of the memory-type electronic identification device, be partially or completely filled with adhesive or resin. FIGS. 17 and 18 illustrate an alternative form of the chip incorporating the half-disc 90 shown in FIGS. 8 and 9, in which alternative form the half-discs 95, 95' include, through the studs 93, 93' and the hollow housings 94, 94', axial through passages 97 and 97' having edges flared outwards towards the external faces 101 and 101'. These communicate with the peripheral annular region 58, taking the annular seal 96, via radial grooves 99 and 99' produced in the bottom of the hollowings 100 and 100' and orifices 109 and 109' emerging at the bottom of the seal 96 (as illustrated in FIG. 18). During injection of the seal 96, still carried out via the edge of the chip, the flow of material blows out via the orifices 109–109' and the grooves 99–99' in order to fill the axial passages 97–97' and lock in place an additional connection between the two half-discs 95–95' (closer to the centre of the chip than the seal itself) which is located at the axial separating projection 60 in the core of the internal central region 56. In addition, the internal central region 56 is well isolated from the seal 96 by the rings 54–54'.

Figure 10:
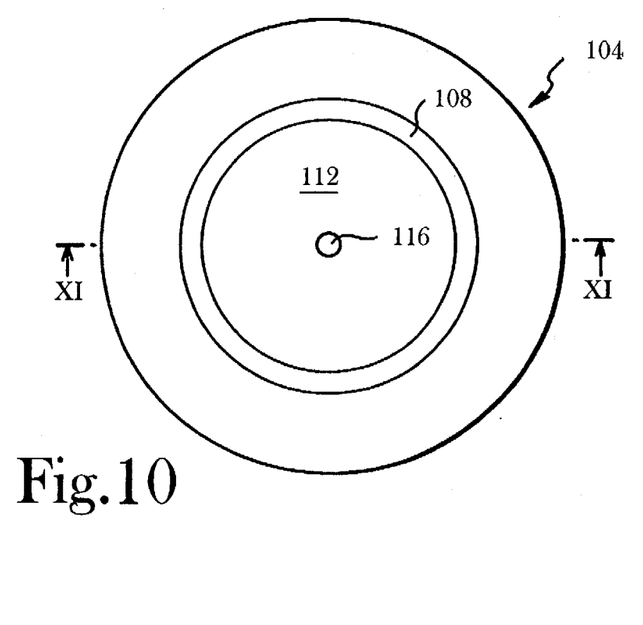
FIG. 10 depicts a front view (on the internal face side) of a half-disc of another embodiment of a gambling chip according to the invention.
Figure 11:
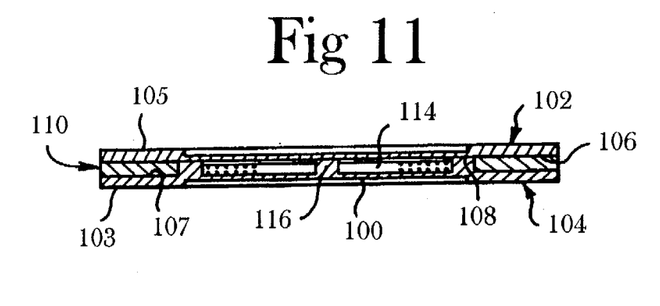
FIG. 11 depicts a diametral sectional view on the line XI—XI of a gambling chip incorporating the half-disc illustrated in FIG. 10.

FIGS. 10 and 11 relate to yet another embodiment of the invention, produced from non-identical half-discs 102 and 104. The half-disc 102 has a substantially plane internal face 106 while the half-disc 104, quite similar to that illustrated in FIGS. 1 and 2, has on its internal face 107 a continuous separating ring 108 which bears directly on the internal face 106 of the half-disc 102 and the axial height of which represents substantially the thickness of the fastening seal 110. The ring 108 isolates the peripheral annular region occupied by the seal 110 from the internal central region 112 in which the wafer 114 incorporating the electronic device is placed (with the free space possibly being filled with adhesive or resin). In an alternative form, the internal face 107 of the half-disc 104 has another axial separating projection, namely a central pin 116 in contact with the internal face 106 of the half-disc 102.

In the various alternative forms of the invention, the rings forming the axial separating projections may be circular, continuous or discontinuous, and coaxial with the half-discs, but they may also be polyhedral, preferably in the form of a regular polyhedron, square, hexagon, etc.

Figure 14:
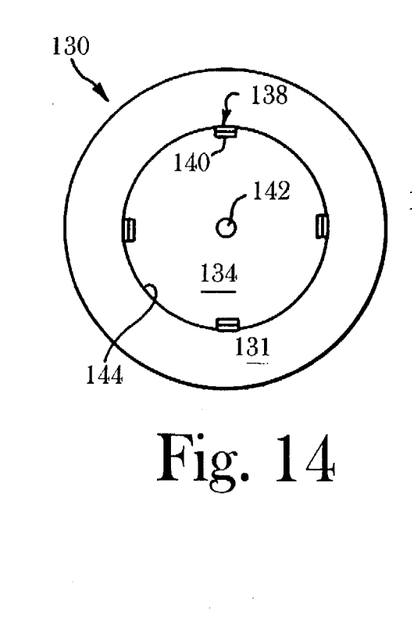
FIG. 14 depicts a front view (on the internal face side) of a half-disc of another embodiment of a gambling chip according to the invention.
Figure 15:
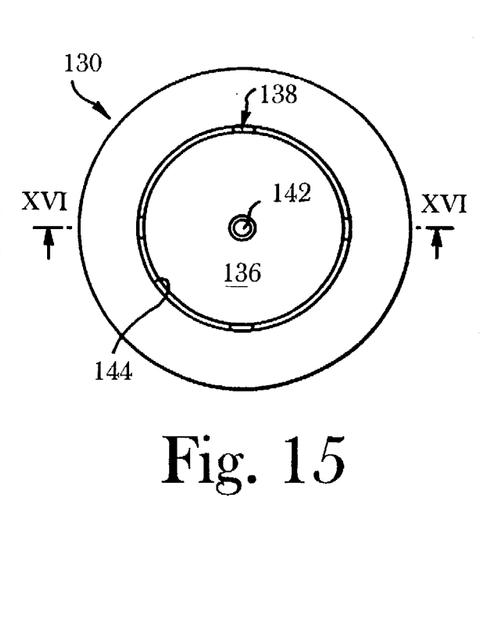
FIG. 15 depicts a front view (on the internal face side) of the half-disc in the FIG. 14 after placing in it a wafer incorporating an electronic device.
Figure 16:
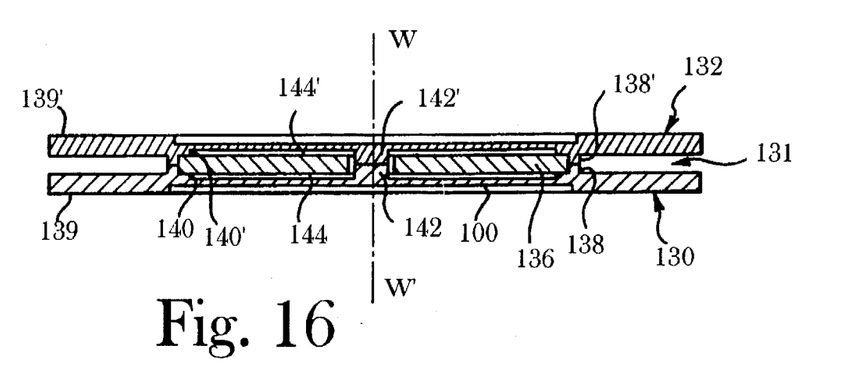
FIG. 16 depicts an enlarged diametral sectional view on the line XVI—XVI of a subassembly of a gambling chip incorporating the half-disc and the wafer which are illustrated in FIG. 15.

FIGS. 14, 15 and 16 relate to another alternative form of the chip according to the invention, produced from identical half-discs 130 and 132. In particular FIG. 16 shows a diametral section (on E—E) of a pre-assembled subassembly before the fastening seal has been injected into the peripheral annular region 131, the two half-discs 130, 132 holding a wafer 136, incorporating a memory-type electronic identification device in place in the internal central region 134. FIGS. 14 and 15 show a view of the internal face of the half-disc 130 respectively without the wafer 136 and with the wafer 136. As illustrated in FIGS. 14 and 16, the internal central region 134 is delimited from the peripheral annular region 131 by a plurality of axial separating projections 138, 138' on the internal face of each half-disc 130 and 132, these axial separating projections consisting of fingers distributed in the form of a ring coaxially with the axis of the chip WW'. The fingers 138, 138' are capable of receiving a ballast insert or electronic identification device. In the present case, he wafer 136 is held in place at the centre of the internal central region 134 by interaction with shoulders 140, 140' provided on the four fingers 138, 138' of each half-disc 130, 132. The wafer 136 is pierced at its centre in order to allow passage for two other axial separating projections 142, 142' arranged in a central position along the axis WW'. In order to make it easier to fill the free space in the internal central region 134 during injection of the seal and to cover the wafer 136 completely, a circular recess 144, 144' having a diameter slightly greater than that provided for the wafer 136 (or for any other insert) is produced on the internal face of each half-disc 130, 132, substantially at the height of the fingers 138, 138'. If necessary, radial guides of the type illustrated in FIGS. 3 to 5 are provided on the internal faces 106, 107 of the half-discs in the peripheral annular region 131. Of course, other alternative forms of chips according to the invention include various numbers of fingers, these having various shapes and arrangements.

We claim:

1. A gaming token, comprising:
   first and second plates disposed adjacent each other about a common central axis;
   a projection extending from at least one of said first and second plates, said projection facing the other of said at least one of said first and second plates, an area between an outer periphery of said projection and an outer edge of said first and second plates defining an interior region;
   a third plate disposed in said interior region about said projection of said at least one of said first and second plates;
   said first and second plates and an inner periphery of said projection defining a central region receiving an insert, said insert being an electronic element which stores information associated with said token, said information including at least one of an identification number, a casino identifier, and a value of said gaming token.

2. The gaming token of claim 1, wherein said electronic element includes a receiver/transmitter having an antenna, and is powered by inductive coupling.

3. The gaming token of claim 1, wherein said insert is held in said central region by at least one of an adhesive, and a resin, and said insert is one of covered with a varnish and encapsulated within a wafer.

4. The gaming token according to claim 1, wherein said plates are one of substantially disc or polyhedral-shaped, or said projection is one of substantially polyhedral and ring-shaped.

5. The gaming token according to claim 1, wherein said projection is one of continuous or discontinuous.

6. The gaming token according to claim 1, wherein said projection extends from said first plate, and an opposing side of said second plate is substantially flat.

7. The gaming token according to claim 1, wherein said projection is a ring, extending from both said first and second plates, which can mate to interlock.

8. The gaming token according to claim 1, wherein said first and second plates are identical.

9. The gaming token according to claim 1, wherein said projection from said at least first and second plates includes a first projection from said first plate and a second projection from said second plate, said first and second projections including at least one stud and at least one complementary recess to facilitate connection of said first and second projections.

10. The gaming chip of claim 1, wherein said inner periphery of said projection has at least one shoulder which can support said insert.

11. The gaming token of claim 1, wherein said central region is at least partially filled with one of an adhesive and a resin.

12. The gaming token of claim 1, wherein said first and second plates are made from at least one material selected from the group consisting of:
   polyacetal and acetal copolymers;
   polyamides and their copolymers;
   poly (alkylens terephthalates) polymers, including polybutylene terephthalate (PBT);
   thermoplastic polyurethanes (PUT);
   vinyl polymers, including polyvinyl chloride (PVC); and
   polyolefins, including polyethylenes (PE) and polypropylenes.

13. The gaming token of claim 1, wherein said third plate is made from at least one material selected from the group consisting:
   polyacetal and acetal copolymers (POM);
   polyamides and their copolymers;
   poly (alkylens terephthalates) polymers, especially polybutylene terephthalate (PBT);
   thermoplastic polyurethanes (PUT);
   vinyl polymers, including polyvinyl chloride (PVC); and
   polyolefins, including polyethylenes (PE) and polypropylenes.

14. A gaming token, comprising:
   first and second plates disposed adjacent each other about a common central axis;
   a projection extending from at least one of said first and second plates, said projection facing the other of said at least one of said first and second plates, an area between an outer periphery of said projection and an outer edge of said first and second plates defining an interior region;
   a third plate disposed in said interior region about said projection of said at least one of said first and second plates; and
   a plurality of radial projections on at least one of said first and second plates.

15. The gaming token according to claim 14, wherein said plurality of radial projections extend one of radially inward from an outer periphery of said at least one of said first and second plates and extends radially outward from said projection.

16. A gaming token, comprising:
   first and second plates disposed adjacent each other about a common central axis;
   a projection extending from at least one of said first and second plates, said projection facing the other of said at least one of said first and second plates, an area between an outer periphery of said projection and an outer edge of said first and second plates defining an interior region;
   a third plate disposed in said interior region about said projection of said at least one of said first and second plates; and
   a projection which extends from a center from at least one of said first and second plates.

17. A gaming token, comprising:
   first and second plates disposed adjacent each other about a common central axis;
   a projection extending from at least one of said first and second plates, said projection facing the other of said at least one of said first and second plates, an area between an outer periphery of said projection and an outer edge of said first and second plates defining an interior region;

a third plate disposed in said interior region about said projection of said at least one of said first and second plates; and at least one of said first and second plates include at least one of a peripheral cutout and an aperture, said third plate extending through said at least one of said peripheral cutout and said aperture.

18. The gaming token of claim 17, wherein said at least one of a peripheral cutout and an aperture is beveled to lock said third plate and at least one of said first and second plates.

19. A gaming chip, comprising:
first and second coaxial discs having first and second coaxial substantially ring-shaped projections, respectively, said first and second projections mating to separate a space between said first and second discs into a central region and an outer annular region; and a sealant, injection molded into at least said outer annular region.

20. The gaming chip of claim 19, wherein said central region receives an insert, said insert being at least one of a ballast, said sealant, and an electronic element which can store and transmit information associated said gaming chip.

21. The gaming chip of claim 20, wherein said insert is held in said central region by at least one of an adhesive, and a resin, and said insert is one of covered in varnish and encapsulated in a wafer.

22. The gaming chip according to claim 19, said first and second projections mating to form one of a continuous barrier to prevent said sealant from entering said central region, and a discontinuous barrier to permit introduction of said sealant into said central region.

23. The gaming chip of claim 19, at least one of said first and second discs including at least one radially extending finger in said outer annular region to guide the application of said sealant.

24. A gaming chip, comprising:
first and second discs, each having a circular projection which can mate to separate a surface between said first and second disks into a central region and an outer annular region;

a sealant disposed between said first and second discs in said outer annular region; and said circular projection of said first and second discs preventing said sealant from entering into said central region.

25. The gaming chip of claim 24, wherein said sealant and said first and second discs form the exterior of said gaming chip.

26. The gaming chip of claim 24, wherein an electronic device, capable of storing and transmitting information associated with said gaming chip, is disposed in said central region.

27. The gaming chip of claim 26, further comprising a U-shaped projection disposed within said central region, an inner portion of said U-shaped projection defining a receiving area for said electronic element, and a region between said U-shaped projection and said circular projection defining an antenna receiving area.

28. The gaming chip of claim 24, wherein said circular protrusion includes at least one extension and at least one recess which can mate with an identical configuration in an adjacent disc.

29. The gaming chip of claim 24, wherein said first and second discs include at least one of a peripheral cut-out and an aperture, said sealant extending through said at least one of a peripheral cut-out and aperture to further form the exterior surface of said gaming chip.

30. The gaming chip of claim 29, wherein:
said at least one peripheral cut-out and aperture form a pattern;

said sealant having a different color from said first and second discs such that the extension of said sealant forms patterns on said exterior surface of said chip.

31. The gaming chip of claim 29, wherein at least one of a peripheral cut-out and an aperture are beveled to lock said sealant with said first and second discs.

32. A system for using gaming chips, comprising:
a plurality of gaming chips, comprising:
first and second discs, each having a projection which can mate to separate a surface between said first and second disks into a central region and an outer annular region;

a sealant disposed between said first and second discs in said outer annular region; and an electronic element, disposed in said central region, capable of storing and transmitting information associated with said gaming chip; and an electronic reader, capable of communicating with at least one of said plurality of chips placed in proximity to said reader by retrieving said information from said electronic element in at least one of said plurality of chips.

33. A gaming chip, comprising:
first and second adjacent plates, at least one of said first and second plates having a projection to separate said first and second plates;

at least one of said first and second plates having at least one of an at least one peripheral cut-out and at least one aperture;

a sealant filling an area between said first and second adjacent plates and extending into said at least one of an at least one peripheral cut-out and at least one aperture.

34. The gaming chip according to claim 33, wherein said at least one of an at least one peripheral cut-out and at least one aperture form at least one of a pattern and a decoration on an exterior surface of said gaming chip.

35. The gaming chip according to claim 33, wherein said at least one of an at least one peripheral cut-out and at least one aperture is beveled to interlock said sealant with said first and second plates.

36. A gaming token, comprising:
first and second plates disposed adjacent each other about a common central axis;

a projection extending from at least one of said first and second plates, said projection facing the other of said at least one of said first and second plates, an area between an outer periphery of said projection and an outer edge of said first and second plates defining an interior region; and a third plate disposed in said interior region about said projection of said at least one of said first and second plates to connect said first and second plates, wherein at least one of said first and second plates includes at least a peripheral cut-out and an aperture, wherein said third plate overlaps into said at least a peripheral cut-out and an aperture to lock said third plate with said at least one of said first and second plates.

37. A gaming token, comprising:

first and second plates disposed adjacent each other about a common central axis;

a projection extending from each of said first and second plates, said projections facing the other of said first and second plates, an area between an outer periphery of said projections and an outer edge of said first and second plates defining an interior region;

at least a portion of said projection of said first plate having a lip;

at least a portion of said projection of said second plate having a groove for receiving said lip; and a third plate disposed in said interior region about said projections of said first and second plates to connect said first and second plates, wherein at least one of said first and second plates includes at least a peripheral cut-out and an aperture, wherein said third plate overlaps into said at least a peripheral cut-out and an aperture to lock said third plate with said at least one of said first and second plates.

38. The gaming token of claim 37, wherein said first and second plates have identical shapes.

39. A gaming token, comprising:

first and second plates disposed adjacent each other about a common central axis;

a projection extending from at least one of said first and second plates, said projection facing the other of said at least one of said first and second plates, an area between an outer periphery of said projection and an outer edge of said first and second plates defining an interior region; and a third plate disposed in said interior region about said projection of said at least one of said first and second plates, said third plate fastening to said first and second plates free of adhesive.

* * * * *